(12) United States Patent
Chagarlamudi et al.

(10) Patent No.: US 12,703,239 B2
(45) Date of Patent: Aug. 11, 2026

(54) RAM AIR DUCT AND DEFLECTOR

(71) Applicant: FCA US LLC, Auburn Hills, MI (US)

(72) Inventors: Venkata Krishna Mohan Chagarlamudi, Rochester Hills, MI (US); Arturo Guzman-Magana, LaSalle (CA); Sreekanth Surapaneni, Oakland, MI (US)

(73) Assignee: FCA US LLC, Auburn Hills, MI (US)

( * ) Notice: Subject to any disclaimer, the term of this patent is extended or adjusted under 35 U.S.C. 154(b) by 425 days.

(21) Appl. No.: 18/451,516

(22) Filed: Aug. 17, 2023

(65) Prior Publication Data

US 2025/0058622 A1 Feb. 20, 2025

(51) Int. Cl.
*B60K 11/08* (2006.01)

(52) U.S. Cl.
CPC .................................... *B60K 11/08* (2013.01)

(58) Field of Classification Search
CPC ................................ B60K 11/08; B60K 13/02
See application file for complete search history.

(56) References Cited

U.S. PATENT DOCUMENTS 4,971,172 A * 11/1990 Hoffman .............. F02M 35/161 180/69.21
4,976,491 A * 12/1990 Hashimoto .......... B62D 25/081 296/192
5,022,479 A * 6/1991 Kiser ................... F02M 35/088 180/69.25
5,660,243 A * 8/1997 Anzalone ............... B60K 13/02 180/68.1
6,056,075 A * 5/2000 Kargilis ............... B62D 25/105 180/69.2
6,302,228 B1 * 10/2001 Cottereau .............. B60K 11/08 180/69.2
6,373,145 B1 * 4/2002 Hamrick ................... F03D 9/25 290/55
6,510,832 B2 * 1/2003 Maurer ............ F02M 35/10393 180/68.3
7,096,986 B2 8/2006 Borroni-Bird et al.
7,237,635 B2 * 7/2007 Khouw ............ F02M 35/10262 180/68.3
7,370,695 B2 5/2008 Haglsperger et al.
8,201,651 B2 * 6/2012 Salvesen .......... F02M 35/10118 180/68.3
8,205,699 B2 * 6/2012 Ohzono ............... F02M 35/161 180/69.2
8,474,558 B2 * 7/2013 Ohira .................. F02M 35/161 180/68.3

(Continued)

FOREIGN PATENT DOCUMENTS

DE 10244800 A1 * 4/2004 ................ F01P 1/06
DE 102017215522 A1 * 3/2019 ........... B60K 11/085

(Continued)

*Primary Examiner* — Katy M Ebner
(74) *Attorney, Agent, or Firm* — Jeremy J. Klobucar

(57) ABSTRACT

A ram air system for a vehicle includes a duct having an inlet positioned adjacent a grille of the vehicle. The inlet receives high pressure ambient air when the vehicle is moving. A body extends from the inlet. The body extends along an entire axial length of a hood of the vehicle and terminates adjacent a dash panel of the vehicle. An outlet at an end of the body directs air to an area past an engine toward the dash panel.

11 Claims, 2 Drawing Sheets

(56) References Cited

U.S. PATENT DOCUMENTS

| | | | | |
|---|---|---|---|---|
| 8,824,876 | B2 * | 9/2014 | Ohtsuka | B60L 58/34 180/68.1 |
| 9,744,921 | B2 * | 8/2017 | Yamaguchi | B60K 13/02 |
| 9,764,776 | B2 * | 9/2017 | Vigil | B60R 13/07 |
| 10,436,160 | B2 * | 10/2019 | Itagaki | F02M 35/10262 |
| 11,724,589 | B2 * | 8/2023 | Forty | B60K 13/02 180/68.3 |
| 2003/0042055 | A1 * | 3/2003 | Suwa | B60K 13/02 180/68.3 |
| 2003/0188902 | A1 * | 10/2003 | Decuir | B60Q 1/0017 180/68.3 |
| 2004/0108152 | A1 * | 6/2004 | Storz | B60K 13/02 180/68.3 |
| 2005/0230162 | A1 * | 10/2005 | Murayama | B60K 11/08 180/68.1 |
| 2014/0299396 | A1 * | 10/2014 | Tajima | B60K 11/08 180/68.1 |
| 2015/0274003 | A1 * | 10/2015 | Laakso | F02M 35/161 180/68.3 |
| 2018/0073476 | A1 * | 3/2018 | Roten | F02M 35/0209 |
| 2023/0398858 | A1 * | 12/2023 | Moradnia | B60K 11/06 |
| 2024/0408957 | A1 * | 12/2024 | Inagaki | B60R 5/02 |
| 2025/0058622 | A1 * | 2/2025 | Chagarlamudi | B60K 11/08 |

FOREIGN PATENT DOCUMENTS

| | | | | |
|---|---|---|---|---|
| DE | 102019122619 | A1 * | 2/2021 | B60L 50/66 |
| EP | 2942220 | B1 | 1/2017 | |
| JP | 5924025 | B2 | 5/2016 | |

* cited by examiner

RAM AIR DUCT AND DEFLECTOR

FIELD

The present disclosure relates to automotive vehicles and, more particularly, to a ram air duct system delivering fresh ram air to areas of the vehicle that have limited air circulation.

BACKGROUND

This section provides background information related to the present disclosure which is not necessarily prior art.

In a vehicle engine compartment, or the under hood areas, several components lack sufficient air cooling. Thus, the thermal management and performance enhancement due to cooling of these thermal sensitive components is handicapped. Thus, the components are subjected to high thermal convection in a tightly packaged engine compartment under the hood. For example, power transmission unit controls that are situated in the compartment under the hood have no accessibility to fresh air. These components are submerged in a hot under hood environment. Thus, there is a need to improve the air temperature underneath the hood.

Accordingly, options are not available to provide fresh air to an area in the engine compartment where components are sitting high in the engine compartment or are on top of one another. Currently, NACA ducts on the belly pan can target low lying components underneath the hood. Additionally, expensive vehicles may include a water cooled power take-off unit. However, the water cooled units are expensive and add to the cost of the vehicle.

The present disclosure provides fresh ram air to components in the engine compartment. The present disclosure provides fresh cooling air to components secured to the dash panel of the vehicle.

The present disclosure provides an air flow that can be directed to various components. Also, the present disclosure may provide a deflector on the dash panel to enhance the directed flow of the air.

SUMMARY

This section provides a general summary of the disclosure, and is not a comprehensive disclosure of its full scope or all of its features.

According to a first aspect of the disclosure, a ram air system comprises a duct having an inlet positioned adjacent a grille or the front of the vehicle. The inlet receives high pressure ambient air when the vehicle is moving. A body extends from the inlet. The body extends along substantially the entire length of a vehicle hood and terminates adjacent a dash panel of the vehicle. An outlet end of the body directs air to an area toward the dash panel. The body includes a bend to direct air flow away from the hood. A deflector may be attached to the dash panel. The deflector directs air to higher temperature components. The duct has an overall rectangular cross-section that is tapered from the front to the rear with an increasing height at the dash panel.

According to a second aspect of the disclosure, a vehicle has ram air system with a front grille, an engine compartment and a hood covering the engine compartment. The ram air system has a duct having an inlet positioned adjacent a grille or the front of the vehicle. The inlet receives high pressure ambient air when the vehicle is moving. A body extends from the inlet. The body extends along substantially the entire length of a vehicle hood and terminates adjacent a dash panel of the vehicle. An outlet end of the body directs air to an area toward the dash panel. The body includes a bend to direct air flow away from the hood. A deflector may be attached to the dash panel. The deflector directs air to higher temperature components. The duct has an overall rectangular cross-section that is tapered from the front to the rear with an increasing height at the dash panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
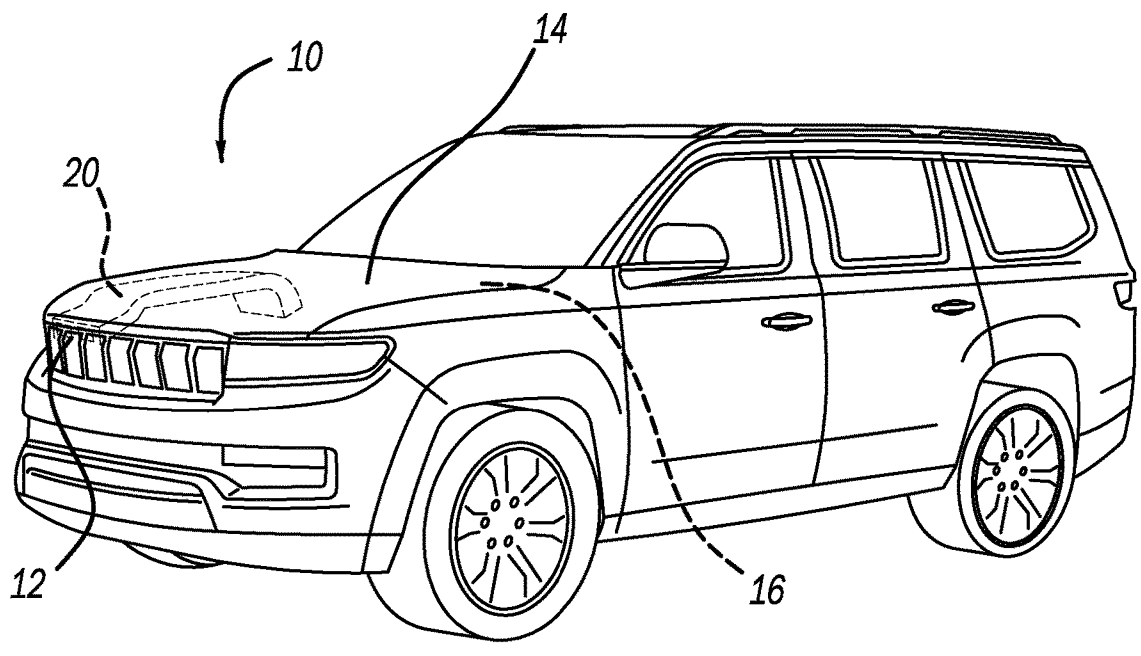
FIG. 1 is a schematic perspective view of a vehicle.
Figure 2:
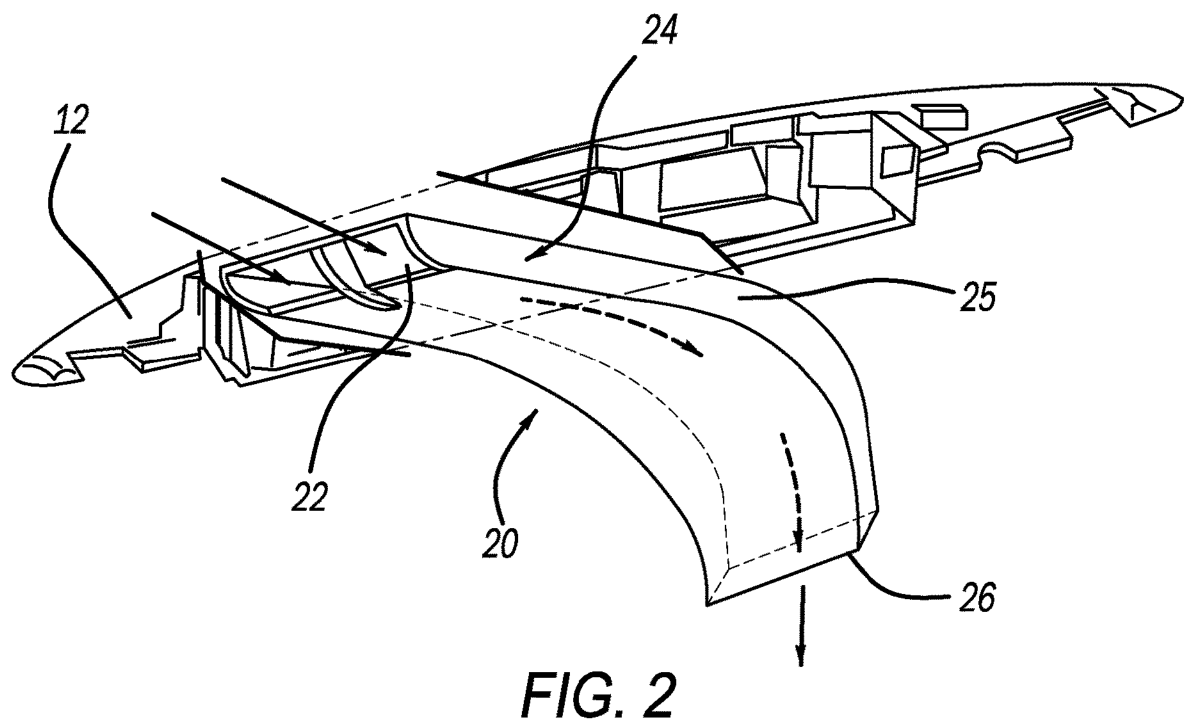
FIG. 2 is a perspective schematic view of a ram area system in accordance with the disclosure.
Figure 3:
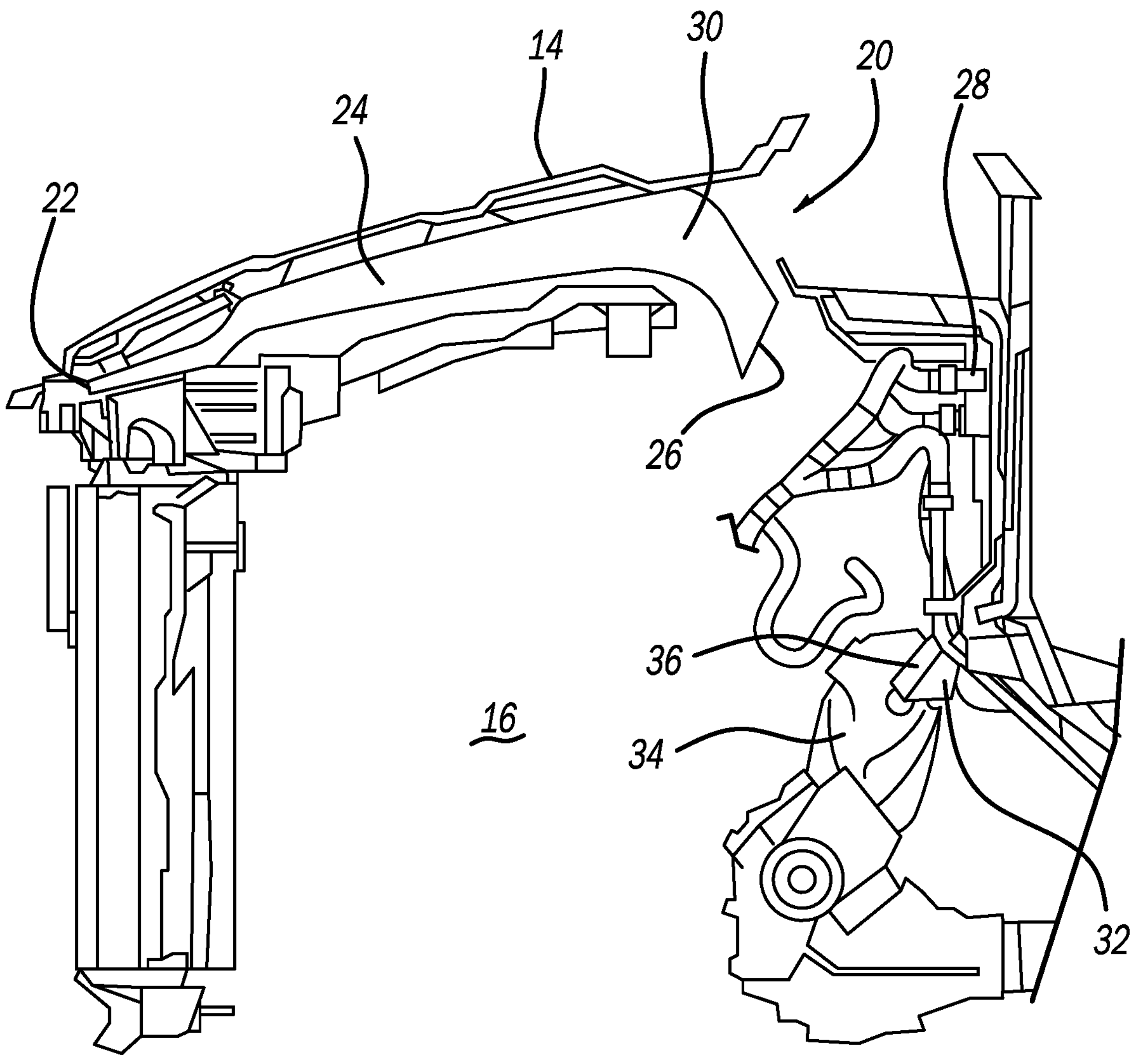
FIG. 3 is a partial schematic cross-section view of the ram air system.

Example embodiments will now be described more fully with reference to the accompanying drawings.

Turning to the figures, a vehicle is illustrated and designated with the reference numeral 10. The vehicle 10 includes a grille 12 at the front of the vehicle 10. Also, a hood 14 covers an engine compartment 16 of the vehicle 10. A ram air system 20 is positioned within the engine compartment 16.

The ram air system includes a duct with an inlet 22 adjacent to the grille 12 to enable ram air to enter the inlet when the vehicle 10 is in motion. The inlet 22 is adjacent a body 25. The duct 24 receives the ram air and delivers it, via an outlet 26, toward the dash panel 28. The dash panel 28 is at the rear of the engine compartment 16. The duct body 25 has an overall rectangular configuration tapering in height from the inlet to the outlet 26. Also, the body 25 includes a bend 30 that includes the outlet to direct the airflow towards a desired position at the dash panel 28. The duct extends the axial length of the hood from the grille to a windshield of the vehicle. The duct provides ram air from the front of the grille to the dash panel.

A deflector 32 is positioned on the dash panel 28. The deflector 32 is positioned to receive the air flow from the duct outlet 26. The deflector 32, in turn, directs the fluid flow towards desired components. As illustrated, the deflector 32 directs an air flow toward the power takeoff unit controls 34 positioned near the top or middle of the engine compartment. Thus, air flow is directed towards components near the dash panel so that the cool air can provide cooling to reduce the temperature of the components within the engine compartment. The deflector includes a surface 36 that can be angled or curved to direct the air flow from the deflector 32 towards the components.

Thus, the ram air system with the duct 24 has the potential to direct ram air to hot pockets and components that require fresh air in the under hood or the engine compartment. This enables the tightly packed components under the hood to receive fresh air for cooling. The deflector 32, along with the duct 24, enables targeting of components that sit higher in the engine compartment that cannot be cooled by conventional NACA ducts. The ram air system is cost effective when compared to costly water cooled components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A ram air system for a vehicle comprising:

a duct having an inlet positioned adjacent a grille of the vehicle, the inlet receiving high pressure ambient air when the vehicle is moving;

the duct being defined by a body extending from the inlet, the body extending along an entire axial length of a hood of the vehicle and terminating adjacent a dash panel of the vehicle, wherein the body is tapered such that a vertical dimension of the duct increases continuously from the grille to the dash panel; and an outlet at an end of the body directing air to an area past an engine toward the dash panel.

2. The ram air system of claim 1, wherein the body includes a bend for directing air away from the hood.

3. The ram air system of claim 1, further comprising a deflector attaching to the dash panel.

4. The ram air system of claim 3, wherein the deflector directing air to heated components.

5. The ram air system of claim 1, wherein the body is axially open.

6. The ram air system of claim 1, wherein the duct has an overall rectangular cross section.

7. A vehicle with a ram air system comprising:

a front grille, a dash panel, and an engine compartment hood that collectively define an engine compartment;

a duct having an inlet positioned adjacent the front grille, the inlet receiving high pressure ambient air when the vehicle is moving;

a body extending from the inlet, the body extending along an entire axial length of the engine compartment hood of the vehicle and terminating adjacent the dash panel, a deflector attached to the dash panel;

a power takeoff unit positioned in the engine compartment; and an outlet at an end of the body that directs the air to the deflector, which deflects the air to the power takeoff unit to cool the power takeoff unit.

8. The vehicle with a ram air system of claim 7, wherein the body includes a bend for directing air away from the hood.

9. The vehicle with a ram air system of claim 7, wherein the body is axially open.

10. The vehicle with a ram air system of claim 7, wherein the duct has an overall rectangular cross section.

11. The vehicle with a ram air system of claim 7, wherein the body is tapered increasing in height from the grille to the dash panel.

* * * * *